(12) United States Patent
Strassenburg-Kleciak

(10) Patent No.: US 8,666,158 B2
(45) Date of Patent: Mar. 4, 2014

(54) SYSTEM FOR FLOOR NUMBER DETERMINATION IN BUILDINGS

(75) Inventor: Marek Strassenburg-Kleciak, Garching (DE)

(73) Assignee: Harman Becker Automotive Systems, GmbH, Karlsbad (DE)

( * ) Notice: Subject to any disclaimer, the term of this patent is extended or adjusted under 35 U.S.C. 154(b) by 116 days.

(21) Appl. No.: 13/407,092

(22) Filed: Feb. 28, 2012

(65) Prior Publication Data
US 2012/0224770 A1 Sep. 6, 2012

(30) Foreign Application Priority Data
Mar. 2, 2011 (EP) ..................................... 11156653

(51) Int. Cl.
*G06K 9/00* (2006.01)
(52) U.S. Cl.
USPC ............ 382/165; 345/419; 382/285; 701/532
(58) Field of Classification Search
USPC ............ 345/419; 382/162, 165, 285; 701/532
See application file for complete search history.

(56) References Cited

U.S. PATENT DOCUMENTS

| | | | | |
|---|---|---|---|---|
| 6,201,544 | B1 * | 3/2001 | Ezaki | 345/419 |
| 6,324,469 | B1 * | 11/2001 | Okude et al. | 701/532 |
| 6,535,812 | B2 * | 3/2003 | Satoh et al. | 701/532 |
| 6,587,784 | B1 * | 7/2003 | Okude et al. | 701/454 |
| 8,040,343 | B2 * | 10/2011 | Kikuchi et al. | 345/419 |
| 8,396,255 | B2 * | 3/2013 | Kmiecik et al. | 382/108 |
| 2008/0319655 | A1 * | 12/2008 | Vande Velde | 701/208 |
| 2009/0141020 | A1 * | 6/2009 | Freund et al. | 345/419 |
| 2010/0201682 | A1 * | 8/2010 | Quan et al. | 345/419 |
| 2010/0202682 | A1 * | 8/2010 | Lieckfeldt | 382/162 |
| 2010/0275018 | A1 * | 10/2010 | Pedersen | 713/168 |
| 2011/0181589 | A1 * | 7/2011 | Quan et al. | 345/420 |
| 2011/0270584 | A1 * | 11/2011 | Plocher et al. | 703/1 |
| 2012/0041722 | A1 * | 2/2012 | Quan et al. | 703/1 |
| 2012/0086727 | A1 * | 4/2012 | Korah et al. | 345/633 |
| 2012/0224770 | A1 * | 9/2012 | Strassenburg-Kleciak | 382/165 |
| 2013/0011069 | A1 * | 1/2013 | Quan et al. | 382/190 |

FOREIGN PATENT DOCUMENTS

| | | |
|---|---|---|
| WO | WO2007/045272 A1 | 4/2007 |
| WO | WO2009/015501 A1 | 2/2009 |

OTHER PUBLICATIONS

Extended European Search Report dated Oct. 28, 2011.
Hoang-Hon Trinh, et al. "Facet-based multiple building analysis for robot intelligence," Applied Mathematics and Computation 205 (2008) 537-549.
Hoang-Hon Trinh, et al. "Image-based Structural Analysis of Building using Line Segments and their Geometrical Vanishing Points," SICE-ICASE International Joint Conference 2006, Oct. 18-21, 2006 in Bexco, Busan, Korea.

(Continued)

*Primary Examiner* — Gregory M Desire
(74) *Attorney, Agent, or Firm* — Patterson & Sheridan, LLP

(57) ABSTRACT

A system may determine a number of floors of a building based on image data of the building. The system may determine a background color of a façade of the building shown in the image data. Using this background color, predefined deviations may then be detected that form the background color in the façade of the building. A mean number of predefined deviations in the vertical direction of the façade of the building may be determined, and the number of floors of the building based on the determined mean number of predefined deviations can be then be deduced.

20 Claims, 6 Drawing Sheets

(56) References Cited

OTHER PUBLICATIONS

Hoang-Hon Trinh, et al. "Line Segment-based Facial Appearance Analysis for Building Image," IEEE, Oct. 18-20, 2006, IFOST2006.

Toon Goedemé, et al. "Fast Wide Baseline Matching for Visual Navigation," IEEE, Computer Society Conference on Computer Vision and Pattern Recognition (CVPR'04) 2004.

Qasim Iqbal, et al. "Applying perceptual grouping to content-based image retrieval: Building images," IEEE, 1999.

N.J.C. Groeneweg, et al. "A Fast Offline Building Recognition Application n a Mobile Telephone," J. Blac-Talon et al (Eds.): ACIVS 2006, LNCS 4179, pp. 1122-1132, 2006.

Wei Zhang, et al. "Hierarchical building recognition," ScienceDirect; Image and Vision Computing 25 (2007); 704-716.

Yi Li, et al. "Consistent Line Clusters for Building Recognition in CBIR," IEEE, 2002.

Kim et al., Object Ananlysis for Outdoor Environment Perception Using Multiple Features, ICIC 2009, LNCS 5754. pp. 605-612.

\* cited by examiner

SYSTEM FOR FLOOR NUMBER DETERMINATION IN BUILDINGS

BACKGROUND OF THE INVENTION

1. Priority Claim

This application claims the benefit of priority from European Patent Application EP 11 156 653.5 filed on Mar. 2, 2011.

2. Technical Field

The present invention relates to a method for determining a number of floors of a building and to a module system determining the number of floors.

3. Related Art

Navigation systems provide driving recommendations for a driver of a vehicle. These navigation systems may provide driving recommendations by simply indicating an arrow indicating the driving direction. Furthermore, map data showing a network of roads may be displayed in a bird's eye perspective to the driver. The recommended route may then be highlighted on the road network shown on the display together with driving recommendations.

In recent years the displayed navigation information became more and more user-friendly and it is known to display a three-dimensional perspective of the scene on a display as seen by the driver. In this context the buildings neighboring the roads are displayed in addition to the roads.

There exist databases including image data of the road network including the vehicle surrounding. In these image data buildings or other monuments as seen from the road are shown. The amount of data needed to provide images of the surrounding in a larger geographical area is quite large, as normally a picture of a building showing the façade of the building includes approximately 2 Megapixel. These detailed image data may not be used in connection with a navigation system incorporated into a vehicle which contain map data of a whole country or a whole continent. At the same time a three-dimensional representation of a vehicle surrounding is needed in which the user of the map data to which the three-dimensional representation is shown may at least recognize the displayed buildings shown in vehicle surrounding when the displayed buildings are compared to the reality when looking out of the window. This is possible when the number of floors of a displayed building corresponds to the number of floors of the building in reality.

Therefore, there exists a need exists to provide a possibility to efficiently and reliably determine the number of floors of a building shown on image data.

SUMMARY

According to a first example, a method for determining a number of floors of a building based on image data of the building is provided, the method includes the steps of determining a background color of a façade of the building shown in the image data. Furthermore, predefined deviations from the background color are detected in the façade of the building and a mean number of predefined deviations in the vertical direction of the façade of the building may be determined based on the detected predefined deviations. Based on the determined mean number of predefined deviations the number of floors of a building may be deduced, the number of floors corresponding to the determined mean number. The background color of a façade, the texture, may be determined easily. Windows or doors in the façade have a different color compared to the façade. When predefined deviations having the shape of windows or doors in the background color of the façade are detected, windows or doors in the façade are detected. From the number of windows/doors in the vertical direction a mean value, the mean number, may be calculated which corresponds to the number of floors with a very high likelihood. When the number of floors of a building may be known together with a floor plan, a schematic view of the building may be generated, which resembles the look of a building in reality.

According to one example the predefined deviations may be determined by dividing the façade of the building in a plurality of vertical sections. The predefined deviations from the background color may then be determined for each vertical section and the mean number of predefined deviations may be determined based on the respective predefined deviations determined for the various vertical sections. By determining the number of predefined deviations in several sections of the façade, the likelihood that the determined mean number corresponds to the number of floors is further increased.

One additional possibility to determine the mean number is the determination of first vertical sections without predefined deviations within the plurality of vertical sections where no predefined deviations are detected. These first vertical sections without predefined deviations may then be excluded from the determination of the mean deviation. In the first vertical sections no windows or doors were detected. Such a vertical section mainly shows the façade without windows. If the number of predefined deviations in this section were included into the determination of the mean deviation, the calculated mean number would not correspond to the number of floors.

Another possibility to further improve the determination of the mean number may be the following: within the plurality of vertical sections, second vertical sections are determined in which a number of predefined deviations differs from the number of predefined deviations determined in other vertical sections by more than a threshold. For determining the number of predefined deviations determined in the other vertical sections, the first vertical sections without deviations may already be excluded. These second vertical sections may then also be excluded from the determination of the mean number. The exclusion of these second vertical sections helps to further improve the reliability of the determination of the number of floors. By way of example a façade may contain a section in which only one window may be provided in the vertical direction, the building having four or five floors. If this vertical section were considered for the determination of the mean number, the result would be distorted. As a consequence, when these second vertical sections are excluded from the determination of the mean number, the accuracy of the determination of the number of floors may be further improved.

For determining whether a deviation in the color of the façade corresponds to a detected window, predefined shapes may be determined and the detected deviations may be compared to the predefined deviations. By way of example, a deviation may be considered to be a predefined deviation when a deviation may be substantially rectangular having a ratio of width to height that may be within a predefined range. By determining the range, different window formats may be included in the detection of the windows.

When the number of floors has been determined, it may be possible to store the number of floors together with other information of the building, allowing a graphical representation of the building to be generated. When the number of floors of a graphical representation corresponds to the reality, a user to which the graphical representation may be shown may easily recognize the displayed building.

One possibility for storing building data allowing a realistic representation of the building with reduced storage capacity may be when the number of floors may be stored linked to the floor plan of the building. Based on the floor plan and the number of floors a realistic representation of the building may be generated.

Furthermore, it may be possible when the number of floors may be known to determine the different floors on the façade of the building based on a distance between vertically neighboring predefined deviations and based on the number of floors. With this knowledge a display image of this building may be generated with different textures for the respective floors of the building. When the displayed information may be used for navigation purposes and when the destination location indicated by the user may be located in a certain floor, it may be possible to indicate the floor on the display where the location of the destination may be situated.

One possibility to determine the different floors may be to determine a boundary between two floors by determining a distance between two vertically neighboring deviations, wherein the boundary may be determined to be at half the distance between two vertically neighboring deviations.

The system furthermore relates to a module for determining the number of floors of the building based on image data of the building, the module comprising a processing unit configured to determine a background color of a façade of the building shown in the image data. The processing unit may be furthermore configured to detect predefined deviations from the background color in the façade of the building and may be configured to determine a mean number of predefined deviations in the vertical direction of the façade of the building. Furthermore, the processing unit may be designed to deduce the number of floors of the building based on the determined mean number, wherein the number of floors corresponds to the determined mean number. The processing unit may determine the mean number as discussed in more detail above and below.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EXAMPLES

Figure 1:
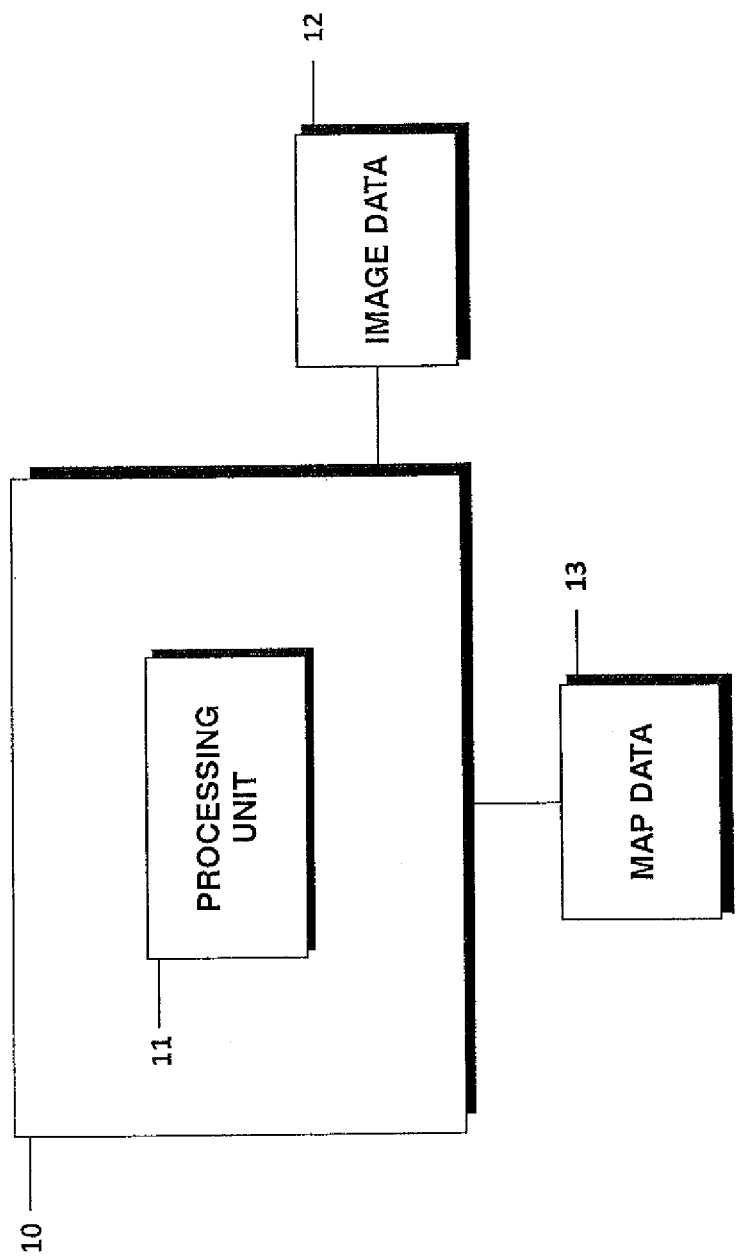
FIG. 1 illustrates a schematic view of an example of a system allowing the determination of the number of floors using image data of a building.

In FIG. 1, a module 10 is schematically shown with which the number of floors of a building shown in image data may be determined with high accuracy. The module 10 may be connected to a database 12 comprising image data of buildings. These image data may have been generated by vehicles driving on a street network while taking images from the surrounding. The image data may have further been generated using airplanes or other flying vehicles. The database containing the image data may be directly connected to the module 10. In another example, the database 12 may be located remote from the module 10 and may be transmitted in portions to the module 10. In still other examples, the database 12 may be divided among multiple databases, or other data storage configurations.

The module 10 may be furthermore connected to map data 13 containing map information as currently used for navigation systems to guide a user to a predefined destination location. For example, the module 10 could be a vehicle navigation system. The map data 13 may contain a road network and may additionally contain information about road surroundings including inter alia buildings. By way of example, the map data 13 may contain a floor plan of buildings in addition to the road network. The module 10 contains a processing unit 11 which may be configured to determine the number of floors of a building using the image data contained in the database 12. The determination of the number of floors of a building will be discussed in further detail with reference to FIGS. 2-5. When the floor number has been determined by the processing unit 11, the floor number of a building may be added to the map data contained in the database 13. The map data containing the street network, a floor plan of the buildings and the corresponding number of floors may then be used in connection with a navigation system. The system shown FIG. 1 may be part of a navigation system. However, it may be also possible that the map data or the floor data determined by the module 10 are provided to a navigation system for further use.

A method for determining the number of floors is discussed in further detail with reference to FIGS. 2 and 3. In FIG. 3, one example of an image stored in the database 12 is shown in more detail. The image shows a housing 300 with a façade 31. In the example shown, the building has three different floors and has a rectangular floor plan.

Figure 2:
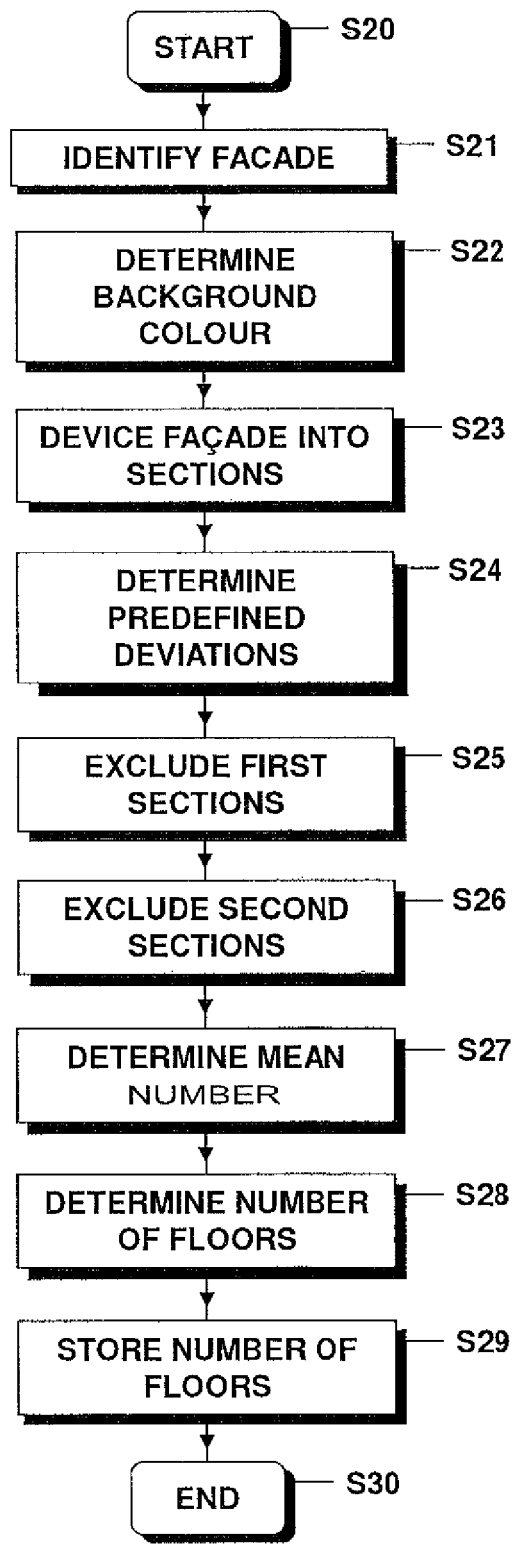
FIG. 2 illustrates an example flow chart containing the steps carried out by the module of FIG. 1 to determine the number of floors.
Figure 3:
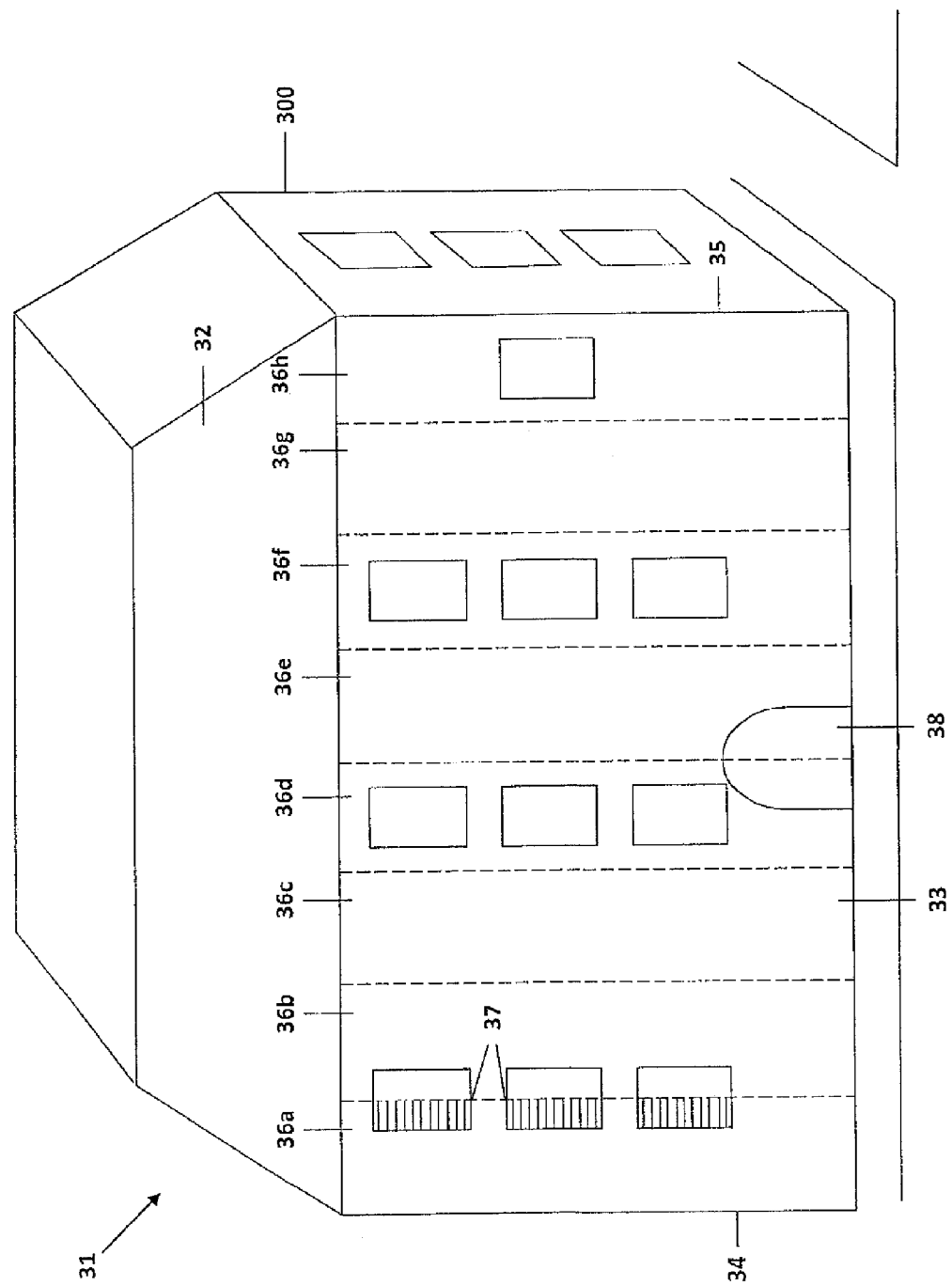
FIG. 3 illustrates a schematic view of an example façade of a building and shows how a mean deviation from a background color of the façade may be determined.
Figure 4:
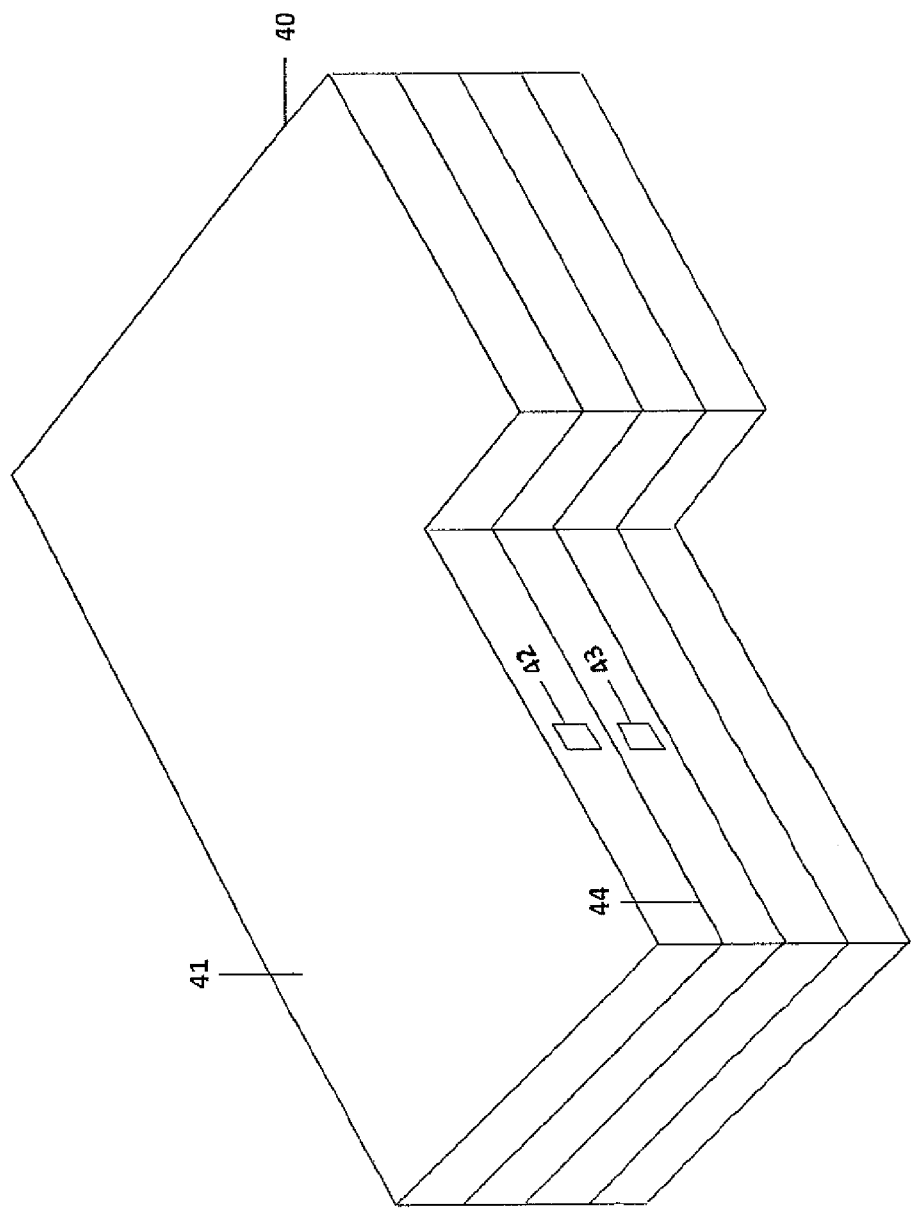
FIG. 4 illustrates a schematic view of an example of a displayed building in which the different floors are shown.
Figure 5:
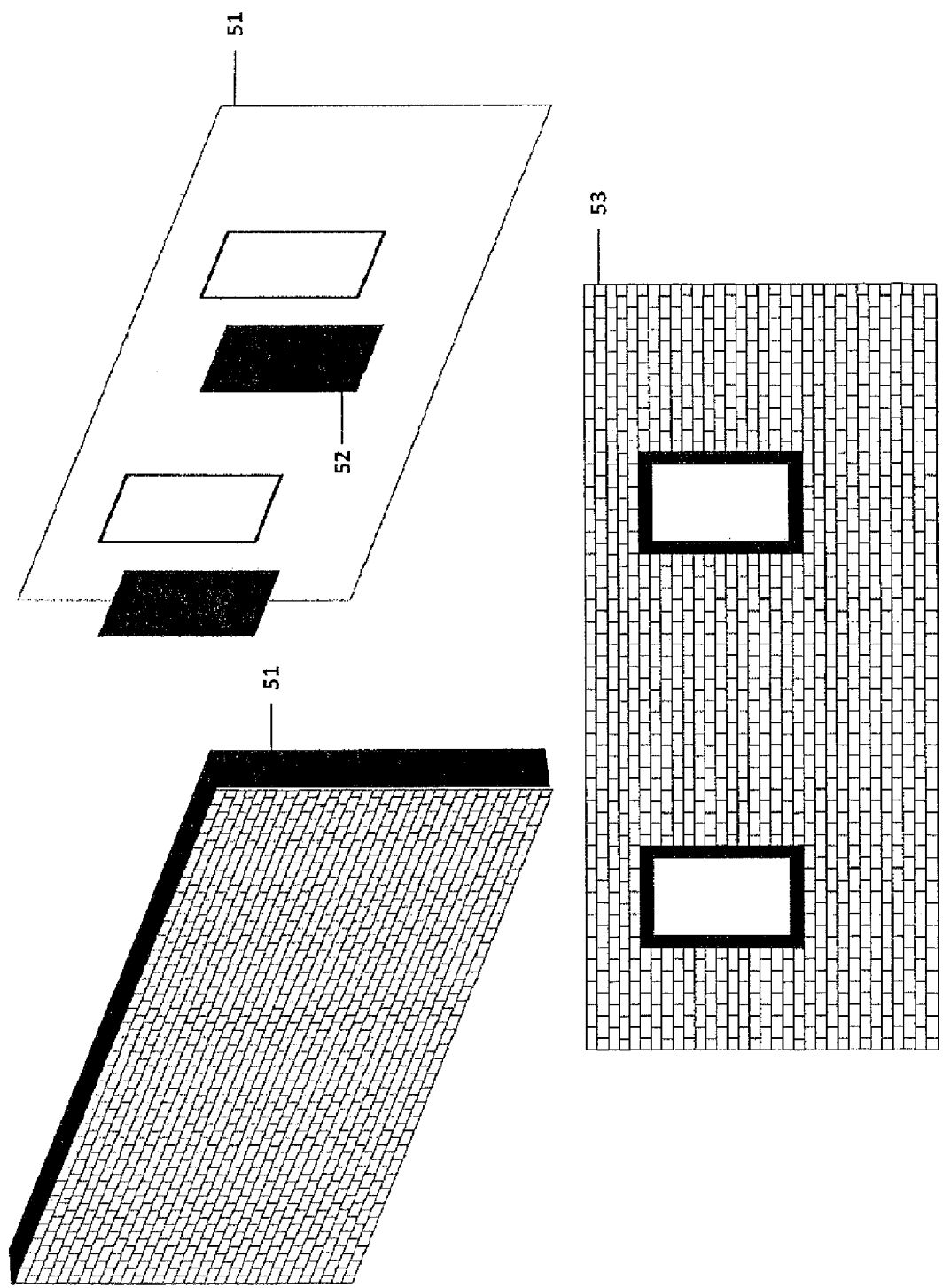
FIG. 5 illustrates a schematic view of an example of how an image of a façade may be generated knowing the background color and the windows.

In connection with FIG. 2, the steps carried out for determining the number of floors based on the image data are discussed in more detail. The method starts in step S20 and in the first step the façade may be identified in the building. As can be seen from FIG. 3, the façade 31 of a housing unit may be determined in the image by using known post-processing algorithms able to detect edges in image data (e.g. Mayny filter or Gaussian filter). By way of example the front façade 31 may be delimited against the roof 32 by an eaves-gutter 33, which may be normally a horizontal line. Using edge detection algorithms known in the art, the image may be processed in such a way that the borders of the façade such as the left and right border 34 and 35 may be detected. These borders, together with the eaves-gutter form the façade (step 21). In the next step the background color of the façade may be determined by determining an RGB value of the façade corresponding to the texture of the façade (step S22). Thus, the façade may be detected in images by detecting a single color surface in a rectangular border. In other examples a uniform texture may be detected as the façade needs not to have a uniform color but may also have a uniform pattern of different colors. In urban areas neighboring buildings are often connected to each other. In order to be able to distinguish two neighboring buildings, the following facts may be taken into account: the height of a building, different colors of the façade, different shape and arrangement of windows, and/or different distance of the buildings to the road.

As may be seen in FIG. 3 the façade may be divided into different vertical sections 36, such as the different sections 36a to 36h (step S23). The different sections are then further processed in order to detect deviations from the background color. The windows 37 or door 38 shown in the image will have a different color than the background. One possibility to determine colors may be the use of a coded space having the form of a cube. The color in this space may be described by three parameters L, a, b. L describes the lightness of a point, a value $L_{max}$ representing the white color, a minimum value $L_{min}$ describing the black color. Parameters a and b do not have boundaries, and a positive a indicates red color, while a negative a represents green. A positive b value indicates yellow, a negative b indicates blue color. In section 36a, the surfaces shown with the dashed lines will be detected. The detected deviations are then categorized and if the detected deviation has a shape that corresponds to a predefined shape, the deviation may be classified as a predefined deviation that may be used to determine the number of floors of the building. By way of example a deviation found on the façade may be considered to be a predefined deviation if the deviation has a substantially rectangular shape. Furthermore, a certain range of a ratio of width to height may be determined. By way of example every deviation which may be rectangular and has a ratio of width to height between 2:1 to 1:8 may be classified as a window or a door. However, it should be understood that a deviation may also be considered to be a predefined deviation when other shapes are detected, such as round shapes or shapes which are rectangular except for the top part, as it may be the case for a door as shown in FIG. 3, where the door 38 is not rectangular at its upper part (step S24).

The number of deviations may be detected for each vertical section 36a-36h. As can be seen from FIG. 3 in section 36c and 36g no deviation may be found which falls under the definition of the predefined deviation.

In the example shown the number of predefined deviations found for each section is as follows:

| Section | 36a | 36b | 36c | 36d | 36e | 36f | 36g | 36h |
| --- | --- | --- | --- | --- | --- | --- | --- | --- |
| Number of deviations | 3 | 3 | 0 | 4 | 1 | 3 | 0 | 1 |

Three predefined deviations are detected in the vertical direction for sections 36a, 36b and 36f, no predefined deviation in sections 36c and 36g, four predefined deviations in section 36d, and one predefined deviation in sections 36e and 36h. Based on the number of predefined definitions found in each section the number of floors may be estimated. To this end the vertical sections where no predefined deviations were detected are identified (section 36c and 36g in the example shown) and these sections are excluded from the calculation (step S25). Furthermore, two sections are found, here sections 36e and 36h, where only one deviation was found, whereas three or four deviations were found in the other remaining sections. After excluding the sections without deviations in step S25, the sections where the number of deviations differs greatly from the number of deviations found in other sections are excluded. For this comparison the sections where no deviations were found are already excluded. Thus, the vertical sections in which predefined deviations have been found are compared to each other, and if the number of deviations found differs from the number found in the other sections by more than a predefined threshold (here two), the corresponding section is also excluded (step S26). Thus, in the example shown, sections 36a and 36h are excluded from the calculation. The remaining sections (sections 36a, 36b, 36d and 360 are then used for determining a mean number of predefined deviations. In the example shown the number of predefined deviations in the remaining sections are as follows: 3, 3, 4, 3. The average deviation for the remaining section is then 3,25 in the example shown. The mean number is now calculated based on the average by taking the next integer, in the example shown—3. If the calculated average were 3,8 or 3,9, the number 4 would be determined as mean deviation. Thus, the next integer located closer to the determined average may be used as mean number (step S27). In the example shown the calculated number of predefined deviations (windows or doors) is 3. In the next step the number of floors may be deduced from the determined mean number, the number of floors simply corresponding to the mean number, in the example shown 3 (step S28). When the calculation determined in step S28 is compared to the Figure shown in FIG. 3, it may be deduced that the correct number of floors was deduced from the image processing. In step S29 the number of floors may be stored together with other information in the map database 13, e.g. together with the floor plan. The method ends in step S30. In the example shown, the mean deviation was determined by rounding the determined average to the next integer.

In 4, an example is shown where a building 40 with a known floor plan 41 is shown. It may be assumed that the number of floors has been determined as explained above in connection with FIGS. 2 and 3. In the example shown the determined number of floors is 4. The processing unit shown in FIG. 1 may furthermore be configured to generate image data using the ground floor information and the information about the number of floors. With these two pieces of information a realistic representation how a building looks like is obtained.

Furthermore, the processing unit 11 may be configured to determine the different floors in the building using the knowledge of the determined number of floors and using the detected predefined deviations. In the example shown in FIG. 4 two windows 42 and 43 are shown. These two windows were detected as predefined deviation as discussed above. When two neighboring windows in the vertical direction were identified, a distance between two neighboring windows may be determined on the image data. With this knowledge the boundary between two floors may be determined by taking half of the distance between the two windows 42 and 43. For this determination of the boundary between two floors vertical sections may be used in which the number of predefined deviations corresponds to the determined number of floors or mean deviation. This helps to avoid that different boundaries or a wrong boundary are determined for one building. Knowing the boundary between two floors, it may be possible to display the different floors with different textures. This makes it easy for the user to differentiate the different floors. If the displayed image of the building may be used in connection with a navigation system and if the floor number of a desired destination may be known, it may be possible to indicate in detail the floor in which the desired destination may be located.

The information about the determined number of floors and the information of the background color may also be used to store the image data in the following way: knowing the background color, the color of the façade, a first layer with the dimensions of the façade may be generated having the color of the determined background. In the example shown in FIG. 5 this layer, the background texture is shown with reference numeral 51. Furthermore, the windows or doors had been determined using the detection of the predefined deviations. A second data layer may be generated including the detected windows. In the upper right part of FIG. 5 the window layer is shown by reference numeral 52. These two layers may then be combined to generate a colored representation as shown in the image 53 in the lower part of FIG. 5. This representation may then be displayed to the user.

When the predefined deviations are detected in the façade, it may be possible that different shapes of windows and doors are detected. The different shapes may then be stored in a library and this library may be used to identify the predefined deviations by comparing the deviations found on a façade to the known predefined deviations stored in the library. If the detected shape falls within the predefined deviations but is not yet included in the library of shapes, the newly found form of the deviation may be added to the library and classified as being a predefined deviation.

Figure 6:
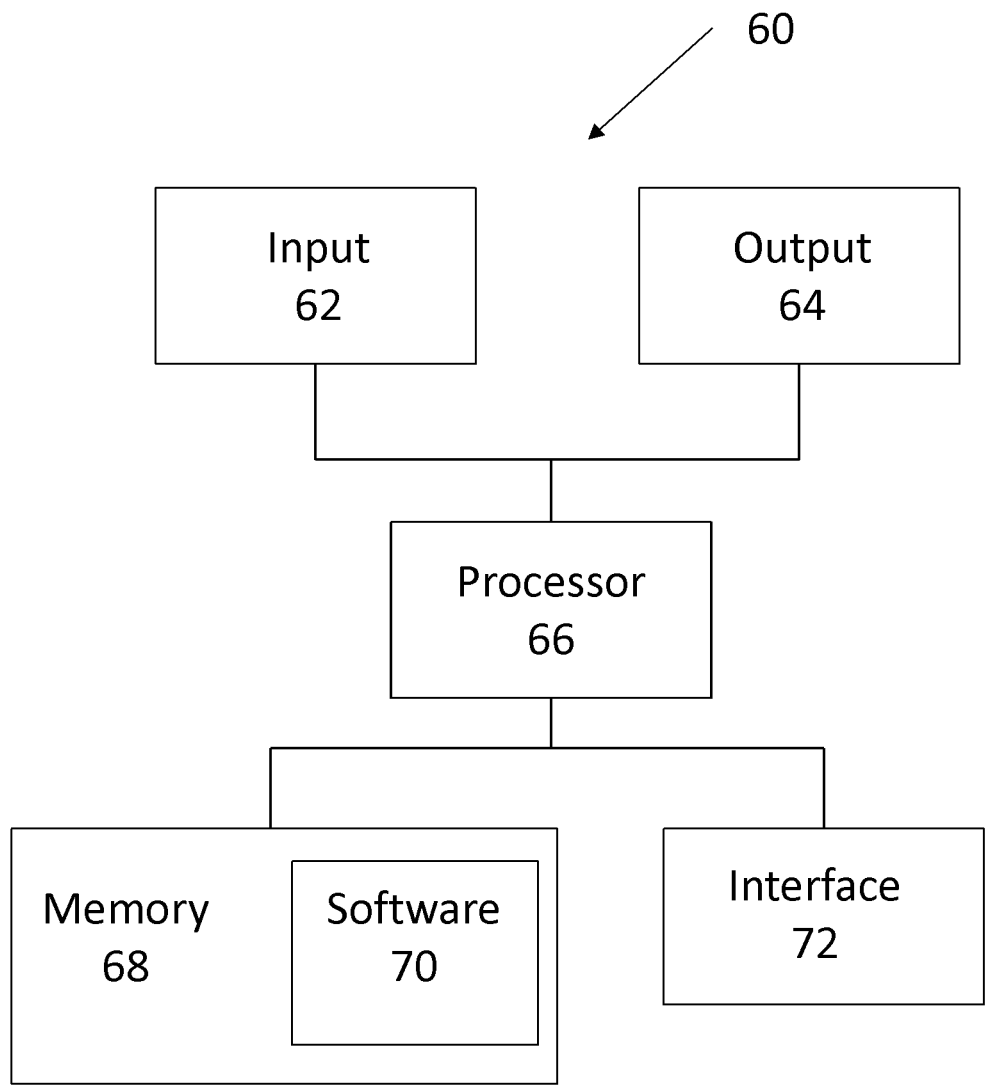
FIG. 6 is an example schematic of a system allowing the determination of the number of floors using image data of a building

FIG. 6 is an example of a system for floor number determination in buildings 60. In addition to one or more inputs 62 and one or more outputs 64, the system 60 may include a processor 66, a memory 68, software 70, and an interface 72. The system 60 may include analog signal processing and digital signal processing capability.

The processor 66 may include one or more devices capable of executing instructions to perform one or more operations within the system 60. In FIG. 7, the processor 66 is incorporated into the system 60. The processor 66 may be one or more general processors, digital signal processors ("DSP"), application specific integrated circuits ("ASIC"), field programmable gate arrays ("FPGA"), server computers, networks, digital circuits, analog circuits, combinations thereof, or other now known or later developed devices for analyzing and processing digital and analogue data. The processor 66 may operate in conjunction with a software program, such as instructions or code and data stored in the system 60.

The processor 66 may be coupled with memory 68, or memory 68 may be a separate component. Software 70 may be stored in memory 68. Memory 68 may include, but is not limited to, computer readable storage media such as various types of volatile and non-volatile storage media, including random access memory, read-only memory, programmable read-only memory, electrically programmable read-only memory, electrically erasable read-only memory, flash memory, magnetic tape or disk, optical media and the like. The memory 68 may include a random access memory for the processor. Alternatively, the memory 68 may be separate from the processor, such as a cache memory of a processor, the system memory, or other memory. The memory may be an external storage device or database for storing recorded data. Examples include a hard drive, compact disc ("CD"), digital video disc ("DVD"), memory card, memory stick, floppy disc, universal serial bus ("USB") memory device, or any other device operative to store data. The memory 68 may be operable to store instructions executable by the processor.

The system 60 may have an interface 72. The interface 72 may include knobs, switches, sliding components, buttons, a mouse, keyboard, a display, a touch screen or other devices or mechanisms capable of receiving user inputs for adjusting, modifying or controlling one or more features of the system 60 and providing outputs sensed by a user. The interface 72 may be used to manipulate one or more characteristics, components, or features of the system 60. For example, the system 60 may include a slider which, when moved, modifies the volume for one or more of the received signals processed by the console. In another example, the interface 72 may include a knob, that when turned, modifies the gain applied by one or more amplifiers in the system 60. In still another example, the interface 60 may be a data input location displayed in a display and a corresponding data input device in which parameters, such as a gain, a threshold, or any other parameter may be entered by a user of the system 60.

The functions, acts, tasks, and/or components described herein may be performed or represented by a programmed processor executing instructions stored in memory. The functions, acts or tasks may be independent of the particular type of instruction set, storage media, processor or processing strategy and may be performed by software, hardware, integrated circuits, firm-ware, micro-code and the like, operating alone or in combination. Likewise, processing strategies may include multiprocessing, multitasking, parallel processing and the like. A processor may be configured to execute the software.

While various examples of the invention have been described, it will be apparent to those of ordinary skill in the art that many more examples and implementations are possible within the scope of the invention. Accordingly, the invention is not to be restricted except in light of the attached claims and their equivalents.

I claim:

1. A method for determining a number of floors of a building based on image data of the building, the method comprising the steps of:
   determining by a processing unit a background color of a façade of the building shown in the image data;
   detecting by the processing unit predefined deviations from the background color in the façade of the building;
   determining by the processing unit a mean number of predefined deviations in a vertical direction of the façade of the building based on the detected predefined deviations; and
   deducing by the processing unit the number of floors of the building based on the determined mean number of predefined deviations, wherein the number of floors corresponds to the determined mean number;
   wherein the predefined deviations are determined by dividing the façade of the building in a plurality of vertical sections, wherein the predefined deviations from the background color are determined for each vertical section, wherein a mean number of predefined deviations may be determined based on the predefined deviations determined for the vertical sections.

2. The method according to claim 1, wherein the step of determining the mean number of predefined deviations further comprises:
   determining by the processing unit second vertical sections within the plurality of vertical sections, in which a number of predefined deviations differs from the number of predefined deviations determined in third vertical sections by more than a threshold; and excluding by the processing unit said second vertical sections from the determination of the mean number of predefined deviations.

3. The method according to claim 1, wherein the step of determining the mean number of predefined deviations further comprises:
   determining by the processing unit first vertical sections without predefined deviations within the plurality of vertical sections where no predefined deviations are detected; and
   excluding by the processing unit said first vertical sections without predefined deviations from the determination of the mean number of predefined deviations.

4. The method according to claim 3, wherein the step of determining the mean number of predefined deviations further comprises:
   determining by the processing unit second vertical sections within the plurality of vertical sections, in which a third number of predefined deviations differs from the number of predefined deviations determined in other vertical sections by more than a threshold; and
   excluding by the processing unit said second vertical sections from the determination of the mean number of predefined deviations.

5. The method according claim 1, wherein a deviation in the façade is a predefined deviation when the deviation is substantially rectangular having a ratio of width to height that is within a predefined range.

6. The method according claim 1, wherein the number of floors is linked to other information of the building allowing a graphical representation of the building to be generated.

7. The method according to claim 6, wherein the number of floors is linked to a floor plan of the building.

8. The method according to claim 1, further comprising the step of generating by the processing unit a display image of the building using a floor plan of the building and the determined number of floors.

9. The method according claim 1, further comprising the steps of:
   determining by the processing unit different floors on the façade of the building based on a vertical distance between vertically neighbouring predefined deviations and based on the deduced number of floors; and
   generating by the processing unit a display image of the building with different textures for the respective different floors of the building.

10. The method according to claim 9, wherein a boundary between two floors is determined by determining a distance between two vertically neighbouring predefined deviations, wherein the boundary is determined to be at half the distance between two vertically neighbouring deviations.

11. A system for determining a number of floors of a building based on image data of the building, the system comprising a processing unit, the processing unit configured to:
   determine a background color of a façade of the building shown in the image data;
   detect predefined deviations from the background color in the façade of the building;
   determine a mean number of predefined deviations in a vertical direction of the façade of the building;
   deduce the number of floors of the building based on the determined mean number of predefined deviations, wherein the number of floors corresponds to the determined mean number;
   wherein the processing unit is further configured to determine the predefined deviations by dividing the façade of the building in a plurality of vertical sections, wherein the predefined deviations from the background color are determined for each vertical section, wherein the mean number of predefined deviations is determined based on the predefined deviations determined for the vertical sections.

12. The system according to claim 11, wherein the processing unit is further configured to:
   determine second vertical sections within the plurality of vertical sections, in which a number of predefined deviations differs from the number of predefined deviations determined in third vertical sections by more than a threshold; and
   exclude said second vertical sections from the determination of the mean number of predefined deviations.

13. The system according to claim 11, wherein the processing unit is further configured to:
   determine first vertical sections without predefined deviations within the plurality of vertical sections where no predefined deviations are detected; and
   exclude said first vertical sections without predefined deviations from the determination of the mean number of predefined deviations.

14. The system according to claim 13, wherein the processing unit is further configured to:
   determine second vertical sections within the plurality of vertical sections, in which a number of predefined deviations differs from the number of predefined deviations determined in third vertical sections by more than a threshold; and
   exclude said second vertical sections from the determination of the mean number of predefined deviations.

15. The system according claim 11, wherein a deviation in the façade is a predefined deviation when the deviation is substantially rectangular having a ratio of width to height that is within a predefined range.

16. The system according claim 11, wherein the number of floors is linked to other information of the building allowing a graphical representation of the building to be generated.

17. The method according to claim 16, wherein the number of floors is linked to a floor plan of the building.

18. The system according to claim 11, wherein the processing unit is further configured to generate a display image of the building using a floor plan of the building and the determined number of floors.

19. The system according claim 11, wherein the processing unit is further configured to:
   determine different floors on the façade of the building based on a vertical distance between vertically neighbouring predefined deviations and based on the deduced number of floors; and
   generate a display image of the building with different textures for the respective different floors of the building.

20. The system according to claim 19, wherein a boundary between two floors is determined by determination of a distance between two vertically neighbouring predefined deviations by the processing unit, where the boundary is determined to be at half the distance between two vertically neighbouring deviations.

\* \* \* \* \*